UNITED STATES PATENT OFFICE.

FRANK LANGFORD, OF EUREKA, CALIFORNIA.

PROCESS FOR PURIFYING ALUMINOUS ORES, EARTHS, CLAYS, AND SAND.

1,251,058.          Specification of Letters Patent.      Patented Dec. 25, 1917.

No Drawing.      Application filed November 22, 1916. Serial No. 132,833

*To all whom it may concern:*

Be it known that I, FRANK LANGFORD, a citizen of the United States, residing at Eureka, in the county of Humboldt, State of California, have discovered and invented a new and useful Process for Purifying Aluminous Ores, Earths, Clays, and Sand, of which the following is a specification in such full and clear terms as will enable those skilled in the art to apply, construct, and use the same.

An object of my invention is to provide a process for removing the impurities, such as iron, calcium, magnesium, potassium, sodium, and soluble metals, minerals, substances and their compounds, from clays, sands, earths and aluminous ores, without at the same time removing much of the aluminum compounds or the silica.

In carrying out my process I treat the material or ore by agitation and leaching with hot water only slightly acid or containing a fraction of one per cent. of sulfuric acid, which minute quantity I have discovered by experiment acts selectively and will dissolve and remove most of the undesirable impurities and will not at the same time or in the same treatment attack or dissolve the silica, or the alumina or aluminum compounds to any appreciable extent.

In treating clays or aluminous materials containing iron, titanium and other common fractional impurities, a simple water wash containing a fraction of one per cent. of sulfuric acid will produce sulfates of iron that are given up to the wash. In the treatment of material to extract lime which is a common impurity, the lime is precipitated as a sulfate or gypsum, a practically insoluble compound that is not attacked to a considerable extent in any subsequent treatment of the washed and purified material for the production of aluminum sulfate, alumina and aluminum.

I claim:

1. The process of treating clays and other aluminous materials containing aluminous compounds and undesirable impurities such as iron compounds, which process comprises agitating and leaching said materials with a hot water solution of sulfuric acid in such proportions of water and acid that said acid dissolves a larger amount of said impurities than of the aluminous compounds.

2. The process of agitating and leaching clays and other aluminous materials containing undesirable impurities such as iron compounds, which process comprises treating said materials with a hot water solution of sulfuric acid containing a fraction of one per cent. acid.

3. The process of treating clays and other aluminous materials containing aluminous compounds and undesirable impurities such as iron compounds, which process comprises treating said materials with a hot water solution of sulfuric acid having not more than about one per cent. acid to selectively dissolve said impurities with a minimum action on the aluminous compounds.

In testimony whereof I have hereunto set my hand this 15th day of November, A. D. 1916, in the presence of the two subscribed witnesses.

FRANK LANGFORD.

Witnesses:
    CARL LANGFORD,
    I. M. LONG.